(12) United States Patent
Pinard et al.

(10) Patent No.: US 6,526,042 B1
(45) Date of Patent: Feb. 25, 2003

(54) SYSTEM FOR INITIATING A CALL UTILIZING JAVA-EMBEDDED EMAIL

(75) Inventors: Debbie Pinard, Kanata (CA); Dave Jarvis, Victoria (CA)

(73) Assignee: Mitel Corporation, Kanata (CA)

( * ) Notice: Subject to any disclaimer, the term of this patent is extended or adjusted under 35 U.S.C. 154(b) by 0 days.

(21) Appl. No.: 09/274,120

(22) Filed: Mar. 23, 1999

(30) Foreign Application Priority Data

Mar. 25, 1998 (GB) .............................................. 9806445

(51) Int. Cl.[7] .............................................. H04L 12/66
(52) U.S. Cl. .................... 370/352; 379/88.17; 709/203; 707/104.1
(58) Field of Search ................................. 370/352, 355, 370/356, 401, 465, 466, 467, 471; 709/201, 206, 218, 203; 707/10, 104.1; 379/88.17, 88.22, 67.1, 88.12, 220.01, 211.01, 231, 142.15

(56) References Cited

U.S. PATENT DOCUMENTS

| | | | |
|---|---|---|---|
| 5,892,909 A | | 4/1999 | Grasso et al. |
| 5,893,091 A | | 4/1999 | Hunt et al. |
| 5,940,834 A | * | 8/1999 | Pinard et al. ................ 707/102 |
| 6,282,270 B1 | * | 8/2001 | Porter ..................... 379/88.17 |

FOREIGN PATENT DOCUMENTS

GB  2 312 593 A  10/1997

* cited by examiner

Primary Examiner—Alpus H. Hsu
Assistant Examiner—Duc Ho
(74) Attorney, Agent, or Firm—Keating & Bennett, LLP

(57) ABSTRACT

A system for permitting a first party to initiate a call from a second party to the first party, comprising a network for providing communication between the first party and the second party; web server connected to the network for storing at least one web page associated with the first party containing a first embedded computer program for creating a voice communication path terminating at a location defined by a predetermined Call Value; a first computer connected to the network for sending at least one message from the first party to the second party requesting the call, wherein the at least one message contains a second embedded computer program for allowing the second party to access the at least one web page; mail server connected to the network for storing the at least one message; a second computer connected to the network for retrieving the at least one message from the mail server and in response accessing the at least one web page by execution of the second embedded computer program and executing the first embedded computer program for initiating the call over the voice communication path from the second party to the first party at the location defined by the predetermined Call Value.

9 Claims, 2 Drawing Sheets

SYSTEM FOR INITIATING A CALL UTILIZING JAVA-EMBEDDED EMAIL

FIELD OF THE INVENTION

This invention relates in general to telephone systems and more specifically to apparatus for locating an intended party to a telephone call while hiding the location of the first party.

BACKGROUND OF THE INVENTION

Voice mail and electronic mail (email) systems are well known for allowing parties to communicate messages between one another. For example, in a voice mail system when a first party (i.e. calling party) wishes to contact a second party (i.e. called party) via telephone, but the second party is not available, the first party may leave a voice message in the voice mailbox of the second party. Because the voice storage capabilities of most voice mail systems are limited, many callers are inclined to leave very short messages wherein the second party is simply requested to return the call to a telephone number and/or extension for the first party. On the other hand, email messages are typically much more detailed since the text storage capacities of email systems is considerable. However, voice conversations are often preferred over email exchanges since a much greater amount of information can be communicated interactively over a short period of time.

A problem arises with prior art voice mail systems in circumstances when the first party (calling party) wishes to remain anonymous or does not wish to leave a telephone number at which he or she can be reached. For example, when the first party is expecting to be at any one of a number of locations when the second party returns the call (e.g. when the first party is traveling), the first party would be required to leave a succession of voice messages with the second party to update his/her location and contact telephone number. This is wasteful in terms of time and effort on the part of both parties, especially if the second party returns the call to an out-dated location based on information contained in an obsolete voice message.

SUMMARY OF THE INVENTION

According to the present invention, a system is provided for a first party to locate a second party via email and to automatically initiate a telephone call from the second party to the first party, and to update the return location of the first party without successive messages. The present invention also allows for the location of the first party to be hidden from the second party.

BRIEF DESCRIPTION OF THE DRAWINGS

In the accompanying drawings which illustrate a working embodiment of the invention.

DESCRIPTION OF THE PREFERRED EMBODIMENT

Figure 1:
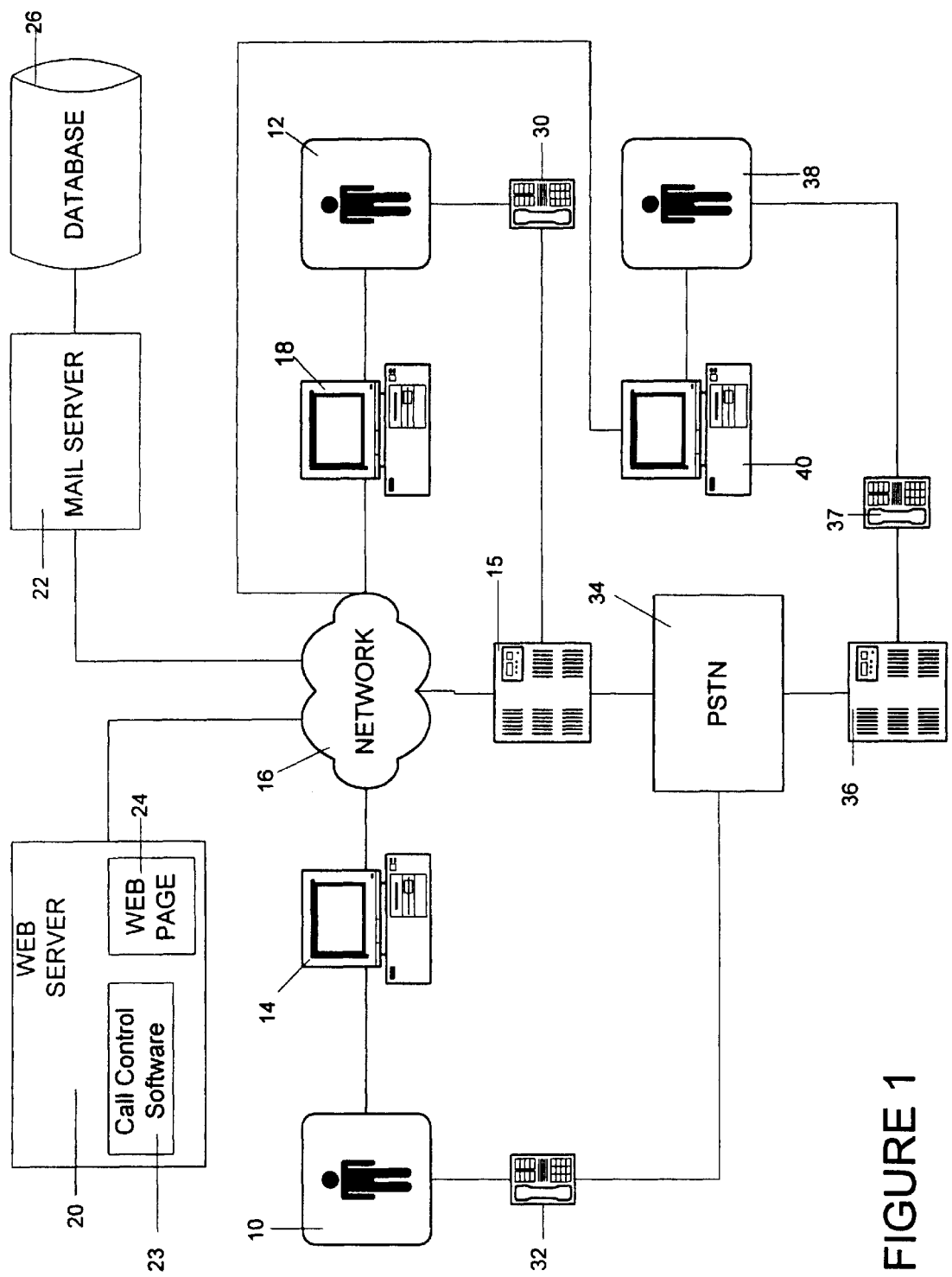
FIG. 1 is a schematic diagram showing a preferred embodiment of the present invention.

A scenario is set forth herein below, with reference to FIG. 1, wherein a first party (i.e. a caller) 10 is attempting to reach a second party (i.e. a called party) 12. Both the first party 10 and the second party 12 have access to voice communication features over one or both of a telephony system (e.g. PBX) or the Internet (e.g. web phone) in accordance with well known commercially available products.

The first party 10 has access to a personal computer 14 which, in turn, is connected to a network 16. In the preferred embodiment, the network 16 is a wide-area network (WAN). The second party 12 also has access to a personal computer 18 which, in turn, is connected to the network 16. In the preferred embodiment, the connections between the personal computers (14 and 18) and the network 16 are through an Ethernet connection but may be through a direct dial in connection. The network 16 is further connected to a PBX 15, a web server 20 and a mail server 22. The web server 20 stores a web page 24 associated with the first party 10 while the mail server 22 stores a database 26 which contains the e-mail messages of the second party 12. The computer 18 of the second party 12 has loaded thereon an e-mail program of well known design which is capable of handling Internet links, as discussed below.

In operation, the first party 10 sends an e-mail message, from the computer 14, via the network 16 to the second party 12 via mail server 22. The e-mail contains a link to the web page 24 associated with the first party 10. The following Java™ code provides such a link:

<A  HREF= http:\\www.mitel.com\employee\pinard\callme.html>Call Me </A>.

The first line of code is a reference to a particular URL (Universal Resource Locator) for the web page 24 associated with the first party 10, and the Call Me section at the end of the second code line is the phrase which the second 12 sees in the e-mail as the link to the web page 24. Additional text or graphic information may be added to the e-mail, for instance to inform the second party of the importance of the telephone call. The phrase Call Me may be changed to any other phrase (e.g. "I may be read by clicking here"), without affecting the operation of the present invention.

The mail server 22 receives the e-mail an stores it in the database 26. When the second party 12 accesses the e-mail via the aforementioned email program executing on computer 18, the mail server 22 returns the stored e-mail in the at abase 26, via the network 16, to the personal computer 18 of the second party 12.

When the second party 12 decides to re the call to the first party 10, the second party 12 need only click on the Call Me link located within the e-mail. This results in launching a web browser on computer 18 which accesses the web page 24 stored on the web server 20, according to the URL reference on the Call Me ink. After being accessed by the second party 12, the web page 24 associated with the first party 10, returns a Java™ call applet containing the location (e.g. telephone number or Internet address of the first party 10 for access by the second party 12. The following lines of code are the necessary code for the Java™ call applet:

<APPLET CODEBASE="AutoDial.class">
<PARAM NAME="CALL" VALUE="4939">
</APPLET>

Figure 2:
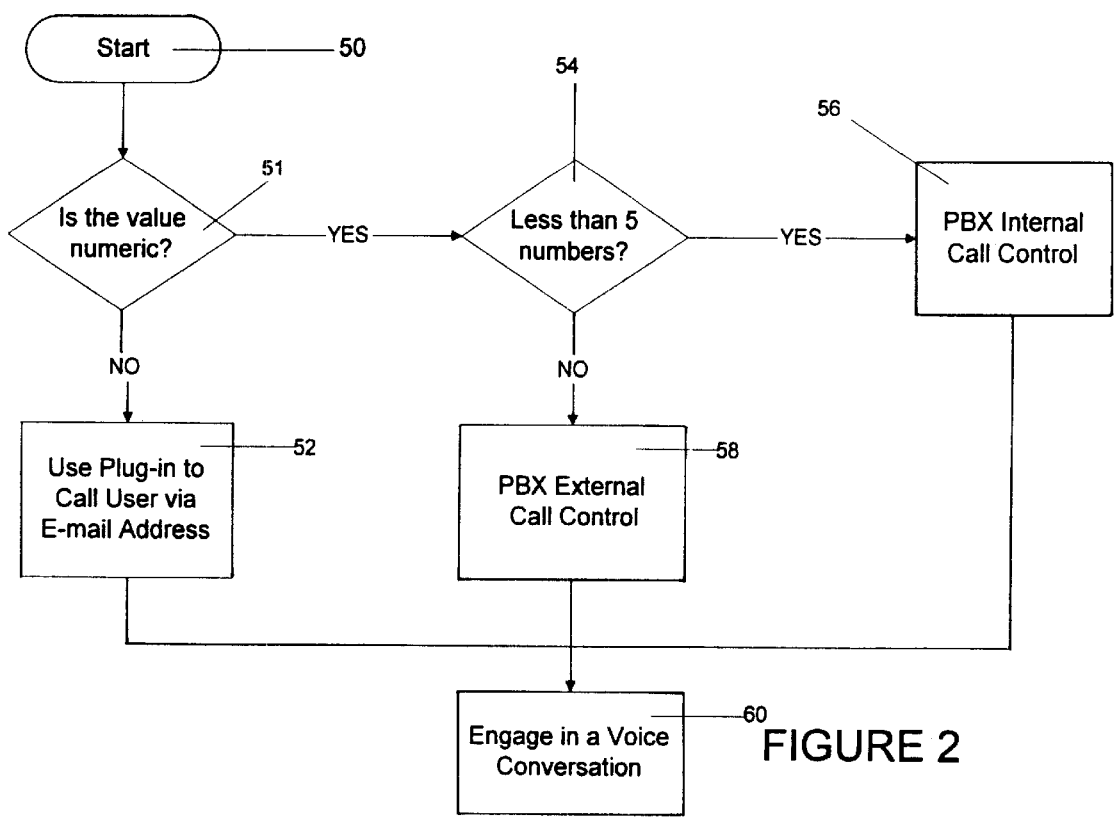
FIG. 2 is a flowchart showing the process of determining a type of call control to use.

After receiving the above Java™ call applet, a decision must be made by the system as to what type of call control is required to complete the call from the second party 12 to the first party 10 (e.g. whether the call is to be establish via regular telephony or over the network). This decision is made by executing a further pro on web server 20, identified in FIG. 1 as call control software 23, which then communicates with and interacts with the appropriate additional software and hardware comprising the system of FIG. 1. The essential aspects of the algorithm embodied in call control software 23 are set forth in FIG. 2.

The program flow begins at step 50. At step 51, the server 20 checks to see if the Call Value defined by the Java™ call applet is exclusively numeric. If the Call Value is not exclusively numeric, a plug-in is called (at step 52) in order to connect the second party 12 to the first party 10 via the e-mail address of the first party 10. With reference to FIG. 1, the voice communication capabilities of computers 14 and 18 are utilized to provide a voice communication path between the first party 10 the second party 12 using well known voice-over-LAN software such as the LiveConnect prod in Netscape® or other products such as manufactured by VocalTech. If the Call Value is numeric, then the Call Value is checked to see if it is less than five digits (step 54). If the Call Value is less than five digits, then the PBX 15 uses internal call control to perform the phone call (step 56) and if it is more than five digits, then the PBX 15 uses external call control to connect the second party 12 to the first party 10 (step 58).

With regard to the internal call control, once the call control software 23 determines that internal call control is to be utilized, PBX 15 establishes a voice communications path between a telephone 30 associated with the second party 12 and a telephone 32 associated with the first party 10. For example, in one embodiment, upon execution of the Java™ call applet, the PBX internal call control software (step 56) determines where second party 12 is logged in to the network 16 and therefore which extension (e.g. telephone 30) is closest to that party. The call control software then issues a command to PBX 15 to pick up on extension "4939" and dial the appropriate number to ring the extension closest to party 12, and thereby establish a voice connection (step 60). Alternatively, the call control software issues a command to PBX 15 to pick up the extension closest to party 12, dial "4939" and then performs a ring-back on the extension closest to party 12. In another contemplated embodiment, a text field window is generated to the second party 12 upon accessing the web page 22. The text field window contains a prompt to enter the telephone number at which the party 12 may be reached. The call control software causes the PBX 15 to initiate a connection between the parties 10 and 12 as set forth above.

The communication between server 20 and PBX 15 can be provided through hardware accessing libraries written in C/C++. Java™ has built-in mechanisms for accessing C/C++ libraries and vice versa thereby ensuring compatibility between the two computer programming languages. Alternatively, a single applet may be executed by the computer 18 of the second party 12 which communicates with server side application written in Java™.

With regard to external call control, the PBX 15 goes through the Public Switched Telephone Network (PSTN) 34 to access a second PBX 36 and establish a voice communication path to a telephone 37 associated with an external second party 38. Alternatively, a voice communication path may be produced between the computer 14 associated with the first party and a computer 40, associated with the external second party 38, provided both computers are capable of voice communication over the Internet, as discussed above. The computer 40 must also be connected to the network 16 via dial-up connection or via the Internet, etc. Once the call control software has determined that external call control is required (steps 54 and 58), the appropriate phone number is dialed and the second party 38 and the first party 10 are able to engage in voice conversation (step 60) using the provided Internet or telephone capabilities.

The first party 10 is also able to change the parameters of the web page 24, via the web server 20, in order to update the Call Value of the first party 10. This allows the first party 10 to change locations without having to send a second e-mail or alert the second party 12 of the location change. This also provides the first party 10 with the opportunity to utilize the many telephony instruments at the disposal of the first party. For instance, the first party could have work related telephone calls directed to the computer 14 and personal telephone calls to the telephone 32.

It will be appreciated that, although a particular embodiment of the invention has been described and illustrated in detail, various changes and modifications may be made. For example, whereas in the preferred embodiment, a WAN has been selected as the network 16, a Local Area Network (LAN) may alternatively be chosen. Also, whereas a distinction is made as between internal and external call control based on whether the "Call" Value is greater than or less than five digits, any number under seven may be chosen or a digit translation algorithm could be used to determine where the number should terminate. Furthermore, whereas a so-called Web phone and regular telephone have been disclosed as the means for establishing voice communications, a microphone and speakers or a video phone may alternatively be used. All such changes and modifications may be made without departing from the sphere and scope of the invention as defined by the claims appended hereto.

What is claimed is:

1. A system for permitting a first party to initiate a call from a second party to said first party, comprising:

a network for providing communication between said first party and said second party;

web server means connected to said network tor storing at least one web page associated with said first party containing a first embedded computer program for creating a voice communication path terminating at a location defined by a predetermined Call Value;

a first computer connected to said network for sending at least one message from said first party to said second party requesting said call, wherein said at least one message contains a second embedded computer program for allowing said second party to access said at least one web page;

mail server means connected to said network for storing said at least one message;

a second computer connected to said network for retrieving said at least one message from said mail server means and in response accessing said at least one web page by execution of said second embedded computer program and executing said first embedded computer program for initiating said call over said voice communication path from said second party to said first party at said location defined by said predetermined Call Value;

determining means for determining what type of call control to use for connecting said first party and said second party, said determining means performing at least one comparison between said predetermined Call Value and a predetermined set of requirements; and communication means for communicating with said determining means and effecting said call over said voice communication path in accordance with said type of call control.

2. The system of claim 1, wherein said network comprises one of either a wide area network (WAN) or a local area network (LAN).

3. The system of claim 1, wherein said first embedded computer program is a Java™ applet.

4. The system of claim 1, wherein said second embedded computer program is a Java™ applet.

5. The system of claim 1 wherein said type of call control comprises one of either internal call control, external call control or a plug-in to call said first party using an e-mail address associated with said first party.

6. The system of claim 1 wherein said determining means is implemented using a third embedded computer program.

7. The system of claim 6 wherein said third embedded computer program is written in C/C++.

8. The system of claim 1 wherein said communications means is implemented using a fourth embedded computer program.

9. The system of claim 8 wherein said fourth embedded computer program is a Java™ applet.

* * * * *